United States Patent [19]
Swartz

[11] 3,984,090
[45] Oct. 5, 1976

[54] METAL RECOVERY METHOD
[75] Inventor: Edwin H. Swartz, Sanford, N.C.
[73] Assignee: Leopold I. Cohen, Jr., Sanford, N.C.; a part interest
[22] Filed: Dec. 12, 1974
[21] Appl. No.: 532,055

Related U.S. Application Data
[63] Continuation-in-part of Ser. No. 457,357, April 2, 1974.

[52] U.S. Cl. ............................ 266/227; 266/901; 75/44 S
[51] Int. Cl.² ............................................ F27B 7/06
[58] Field of Search ............... 75/44 S, 63, 64; 266/33 R, 33 S; 29/403; 266/227, 901

[56] References Cited
UNITED STATES PATENTS

| | | | |
|---|---|---|---|
| 81,164 | 8/1868 | Harmon et al. | 75/64 |
| 850,726 | 4/1907 | Bills | 266/33 R |
| 965,580 | 7/1910 | Higgins | 266/33 S |
| 1,669,485 | 5/1928 | Nordling et al. | 266/33 S X |
| 1,722,372 | 7/1929 | Hallam | 75/63 |
| 3,116,545 | 1/1964 | Brown | 29/403 |

FOREIGN PATENTS OR APPLICATIONS

| | | | |
|---|---|---|---|
| 278,037 | 9/1914 | Germany | 75/63 |

Primary Examiner—Roy Lake
Assistant Examiner—Paul A. Bell
Attorney, Agent, or Firm—Clarence A. O'Brien; Harvey B. Jacobson

[57] ABSTRACT

A non-ferrous metal is recovered from a batch of scrap material by combustion of a fuel to generate heat and transmittal of said heat to the material by convection flow. The flow rate of fuel is regulated to obtain and maintain an optimum temperature below the melting point of the metal causing decomposition of non-metallics in the batch of scrap material within a non-oxidizing atmosphere.

3 Claims, 5 Drawing Figures

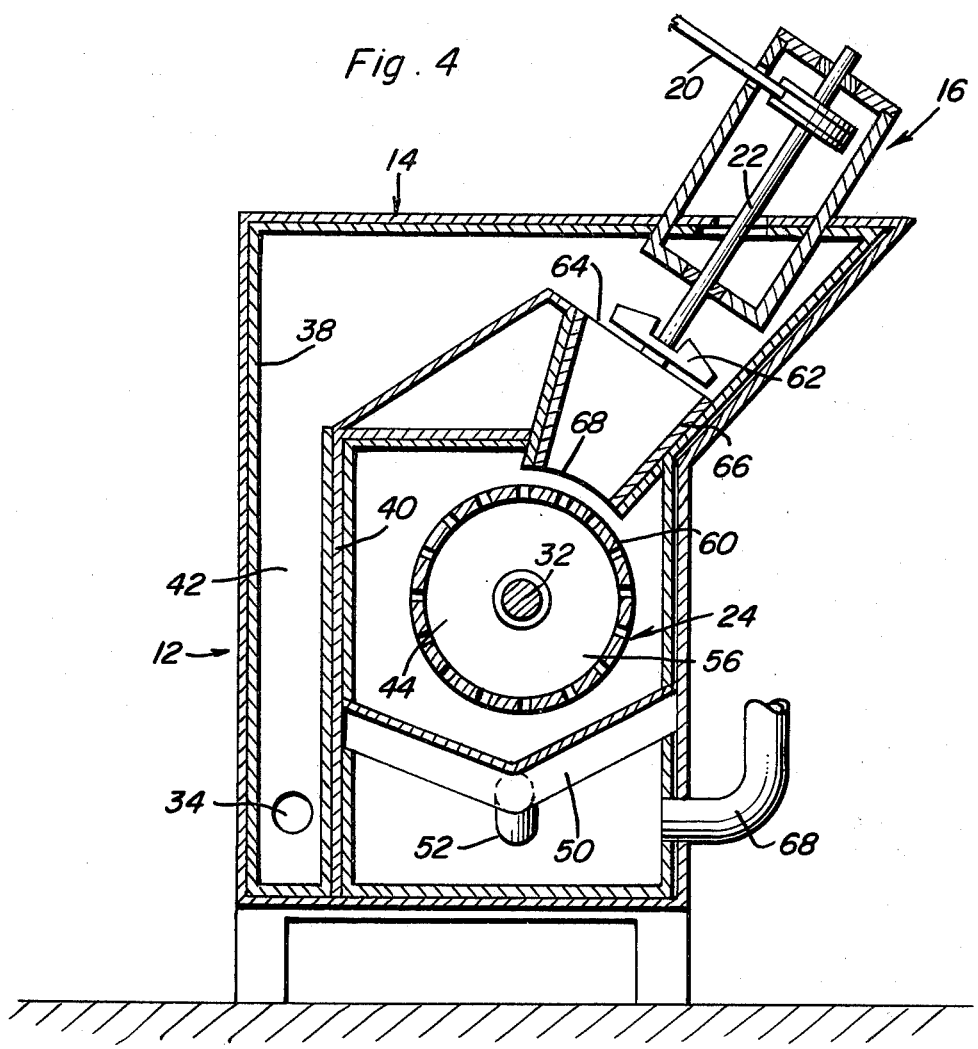

METAL RECOVERY METHOD

This invention relates to the recovery of non-ferrous metals from mixtures of scrap material and is a continuation-in-part of my prior copending application Ser. No. 457,347, filed Apr. 2, 1974.

Reclamation of non-ferrous metals from junked apparatus such as automobiles and other discarded equipment has become of vital interest because of several factors including waste disposal problems and increasing cost of obtaining such metals from its ore. Recovery of non-ferrous metals having high melting temperatures has not however attracted much attention because of the difficulty in separating such metals in substantially pure form from the other components of the scrap mixture.

One economical method, generally known, for recovering non-ferrous metal is to heat the scrap mixture in a fuel combustion furnace to a temperature below the melting point of the metal to be recovered but high enough to cause combustion of the non-metallic components and melting of low melting components such as lead. Easy separation of the metal to be recovered is however, often thwarted by the deposit of combustion products thereon. To avoid such metal contaminating deposits would ordinarily require generation of heat by some non-combustion method and in a non-oxidizing atmosphere so as to cause decomposition of non-metallics without combustion. However, this would make the cost of recovery economically prohibitive.

According to the disclosure in my prior U.S. Pat. No. 3,821,026, copper is recovered from a scrap mixture by economical heating in a combustion furnace that is controllably vented to establish a non-oxidizing atmosphere formed by the fuel combustion products and the volatile portions of decomposition products resulting from the decomposition of the non-metallic coatings on copper. The foregoing method requires a sustained constant optimum temperature until all of the non-metallic components have been decomposed. Similarly, precise temperature control is maintained during decomposition of non-metallics for the zinc recovery method disclosed in my prior copending application, aforementioned. In both cases, temperature control is maintained by varying the inflow rate of the fuel as a function of the heat released by decomposition of the non-metallics. Facilities for varying the fuel inflow rate for this purpose are disclosed in my prior U.S. Pat. No. 3,821,026. In my prior copending application, a charge of scrap material is continuously agitated by rotation of a perforated or foramanous drum within which it is heated and subjected to heat convection current induced by a blower to enhance uniform distribution of heat throughout the mixture.

In accordance with the present invention, a batch of scrap materials containing a high melting point, non-ferrous metal is processed in a furnace for recovery of this metal in an economical fashion by heating thereof in a non-oxidizing atmosphere to an optimum temperature below the melting point of the metal to be recovered. A light or gaseous fuel is fed to a burner for continuous combustion to generate the heat. The temperature is controlled by varying the inflow rate of fuel and is maintained constant at the optimum temperature by decreasing the inflow rate of fuel as a function of the heat released by decomposition of the non-metallics. The non-metallics, whether they be coatings on the metal to be recovered or merely separate pieces of scrap in the batch being processed, decompose into volatiles and a particulate solid residue. The volatile decomposition products mix with the fuel combustion products to form a non-oxidizng atmosphere in the treating zone of the furnace that is controllably vented. The volatiles also carry the heat generated by combustion and decomposition to the scrap material by convection. The solid residues or ashes easily separate from the metal to be recovered. The foregoing process is terminated when substantially all of the non-metallics are decomposed.

To enhance the foregoing process, the batch of scrap materials is agitated by enclosure in a rotating drum that is perforated so that heat is transmitted therethrough by convection and decomposition products may escape or separate therefrom gravitationally. Convection flow is induced by a blower and directed by ducting.

Copper may be recovered by the foregoing process from a batch of scrap wire sections as disclosed in my prior U.S. Pat. No. 3,821,026, or the non-metallics and lead separated from the batch being processed as disclosed in my prior copending application aforementioned, in preparation for subsequent separation and recovery of zinc from the batch by melting.

These together with other objects and advantages which will become subsequently apparent reside in the details of construction and operation as more fully hereinafter described and claimed, reference being had to the accompanying drawings forming a part thereof, wherein like numerals refer to like parts throughout.

FIG. 4 is a front section view taken substantially through a plane indicated by section line 4—4 in FIG. 3.

Figure 1:
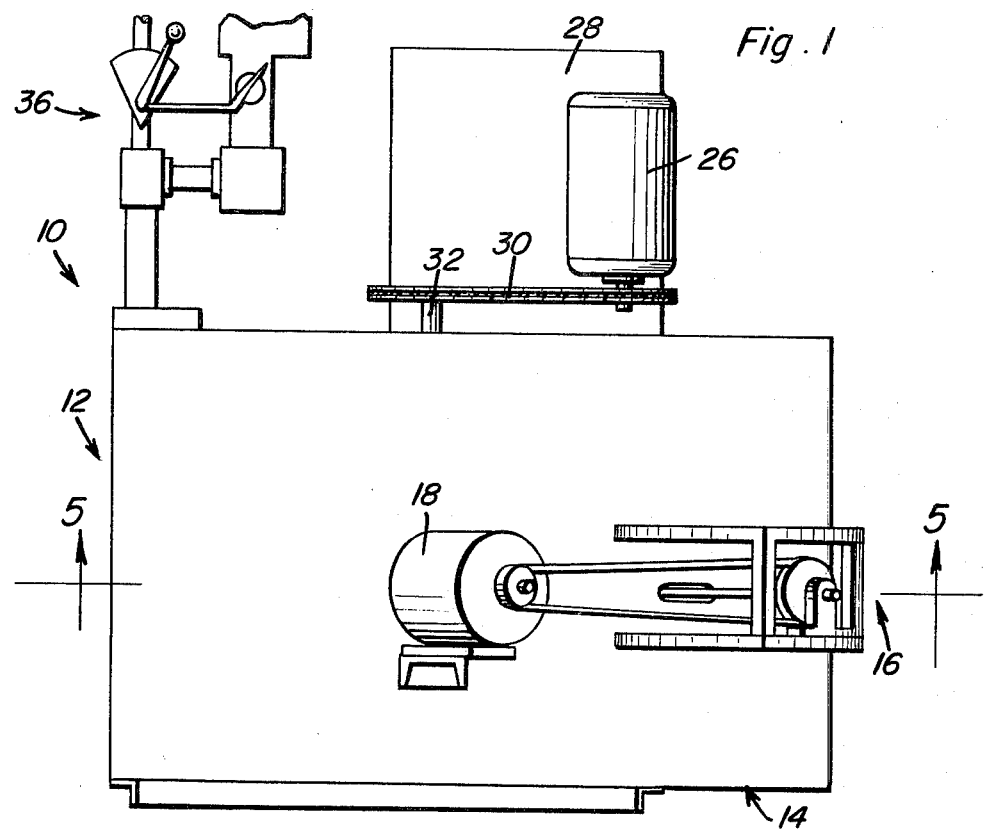
FIG. 1 is a simplified top plan view of apparatus utilized to carry out the method of the present invention.
Figure 2:
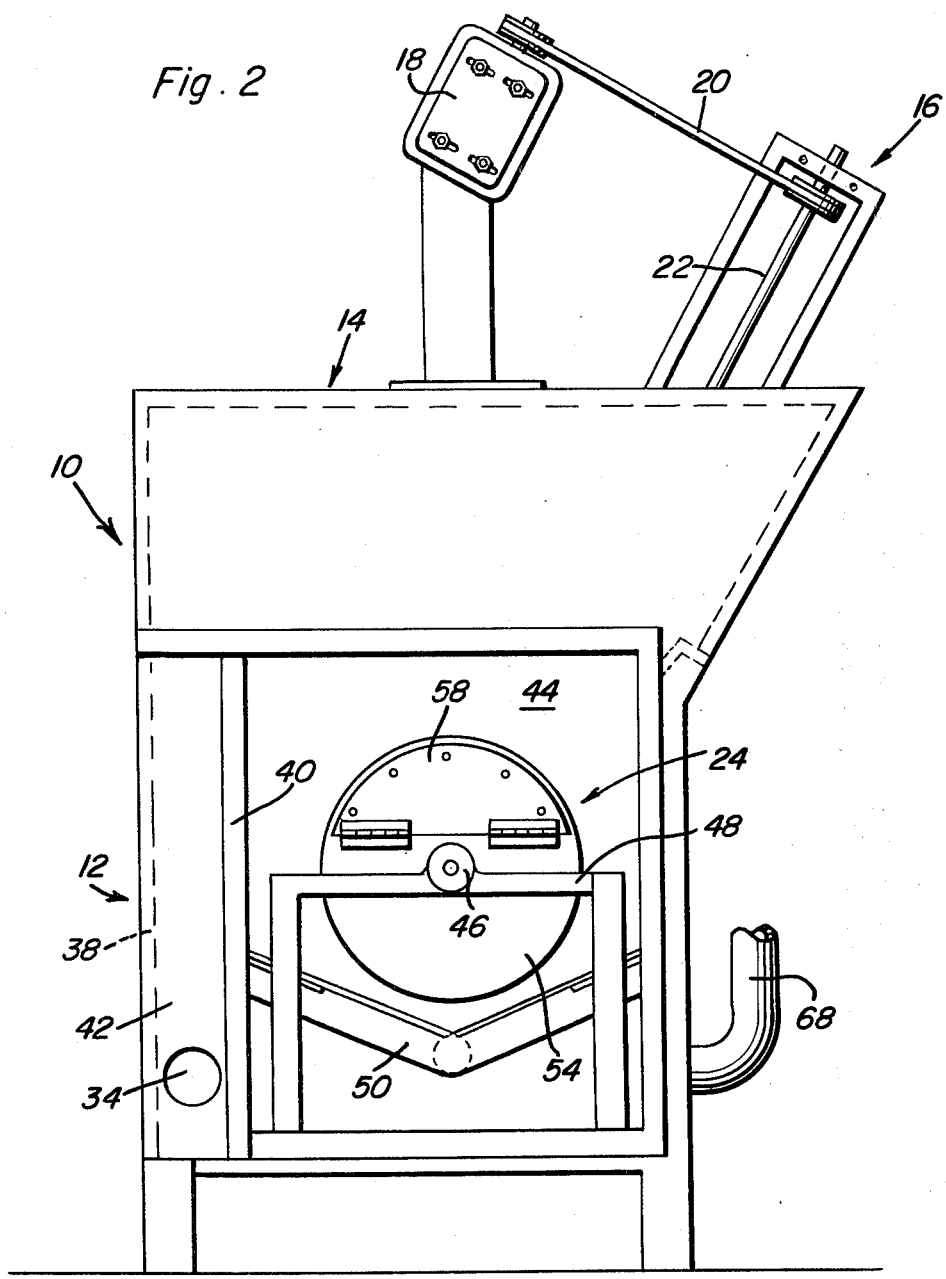
FIG. 2 is a front elevation view of the apparatus shown in FIG. 1 with the furnace loading door removed.
Figure 3:
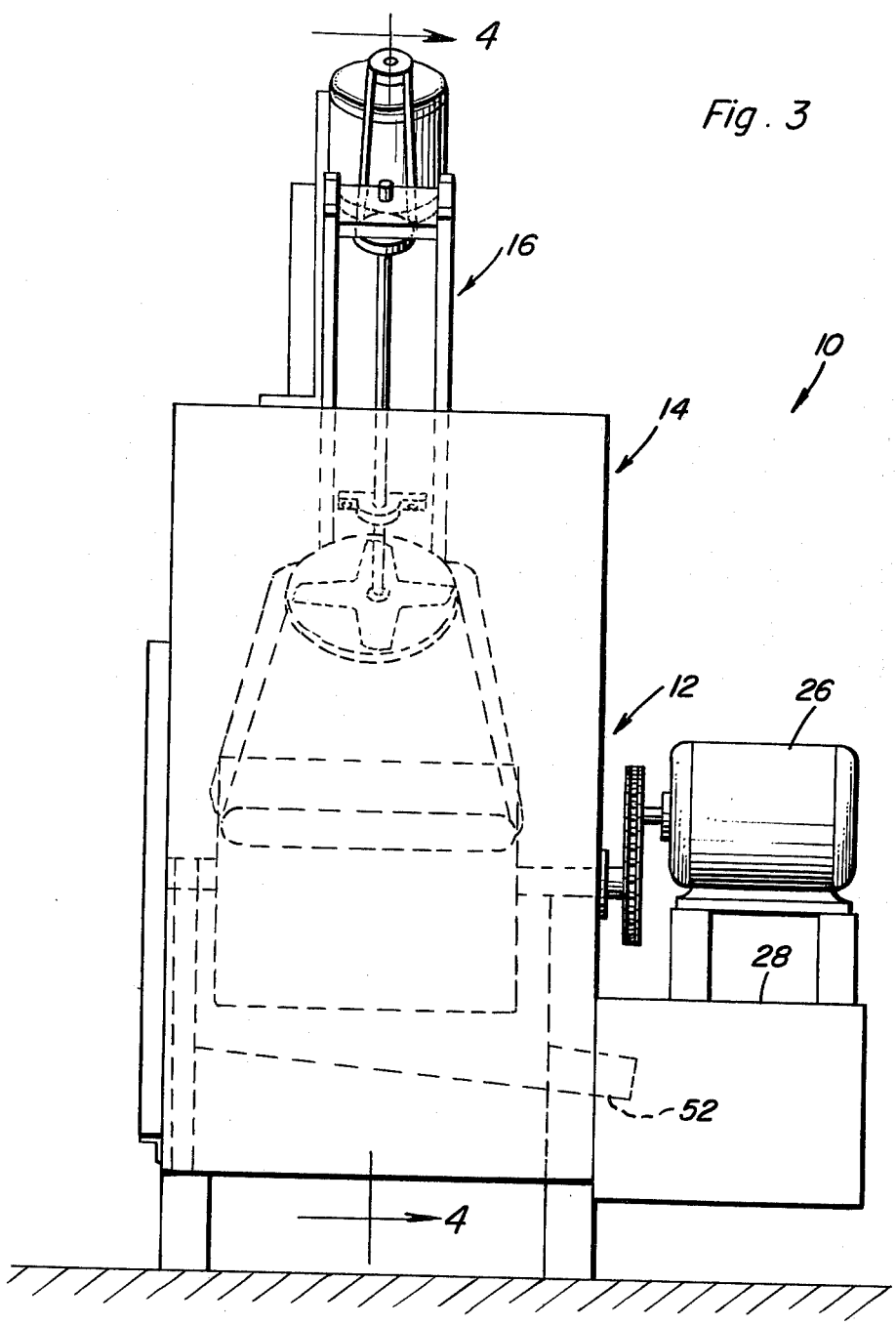
FIG. 3 is a side elevation view of the apparatus shown in FIG. 1.

Referring now to the drawings in detail, FIGS. 1, 2 and 3 illustrate apparatus generally denoted by reference numeral 10 utilized to recover a non-ferrous metal from a batch of scrap material. The apparatus includes a combustion furnace housing generally referred to by reference numeral 12 made of a suitable refractory metal. A combustion gas manifold 14 extends upwardly from the housing 12 and lateral to one side. A blower assembly 16 is mounted on the manifold and includes a fan motor 18 drivingly connected by an endless drive belt 20 to a blower shaft 22 that is journalled for rotation about an axis that extends at a 30° angle to the vertical. The blower shaft axis intersects the rotational axis of a drum 24 that is driven by a drive motor 26 fixedly mounted rearwardly of the furnace housing 12 on a platform 28. The drive motor 26 is drivingly connected by an endless sprocket chain 30 to a drum shaft 32 projecting rearwardly from the furnace housing. Fuel for combustion is supplied to a burner 34 within the housing through a fuel inflow regulating control assembly generally referred to by reference numeral 36. This fuel inflow control assembly is similar in construction and operation to that disclosed in my prior U.S. Pat. No. 3,821,026.

Figure 5:
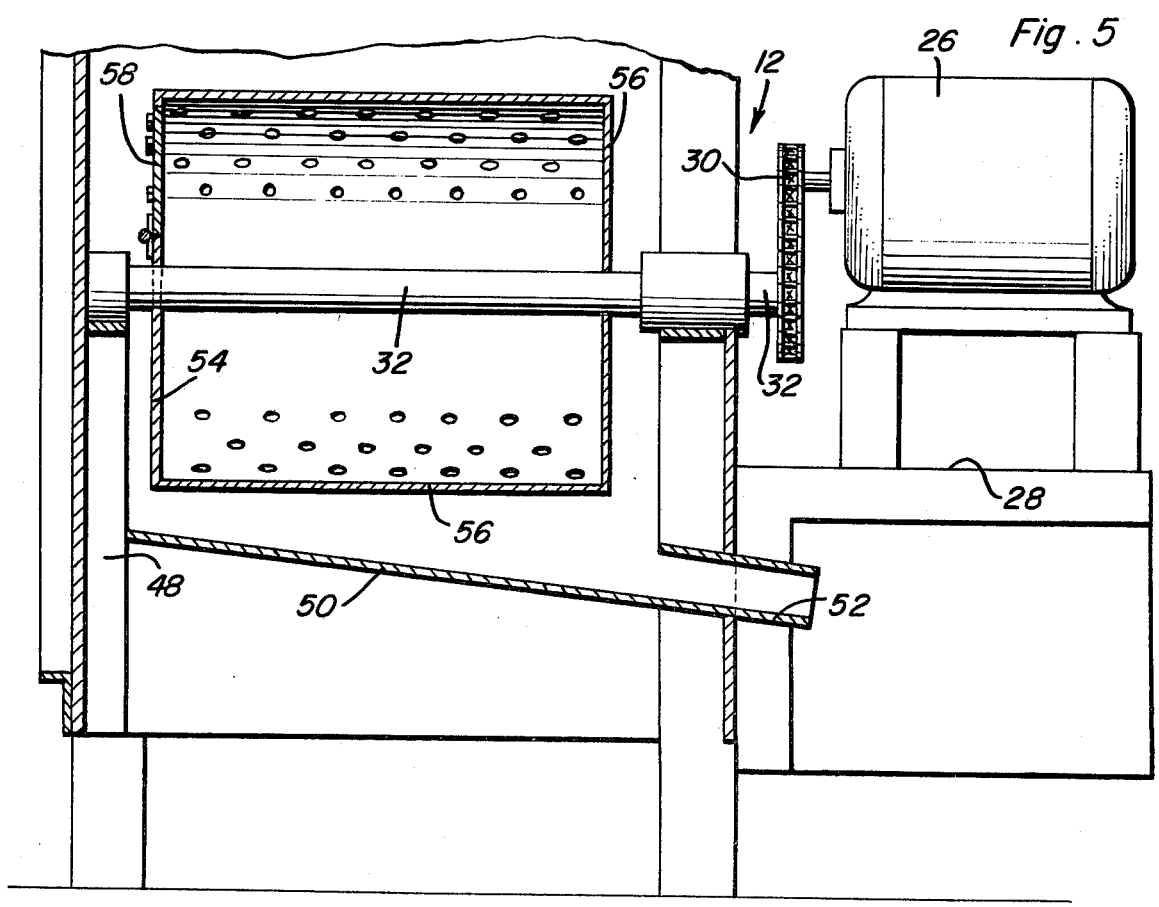
FIG. 5 is a side section view taken substantially through a plane indicated by section line 5—5 in FIG. 1.

As more clearly seen in FIGS. 2 and 4, the furnace housing 12 is internally insulated by an asbestos lining 38 and separated by an insulated partition wall 40 into a fire chamber 42 and a treating zone 44. The burner 34 is located on the rear wall of the housing adjacent the bottom of fire chamber 42 while the drum 24 rotatably mounted in treating zone 44 by spaced bearing 46 in the rear wall of the housing and the drum support frame 48 adjacent the front end of the housing. As more clearly seen in FIGS. 4 and 5, a collection trough 50 is fixedly mounted within the treating zone in spaced underlying relation to the drum 24. A delivery chute 52 extends from the trough rearwardly from the housing.

The drum 24 has imperforate walls 54 and 56 at its front and rear axial ends. A hinged door 58 on the front end wall 54 provides access to the interior of the drum for loading a batch of scrap material thereinto. The cylindrical wall 60 of the drum is perforated so as to permit escape of volatiles therefrom and gravitational deposit of particulate solids and liquids into the collection trough which is rearwardly inclined downwardly.

As more clearly seen in FIG. 4, the manifold 14 is in fluid communication with the upper end of the fire chamber on one lateral side to conduct heated combustion gases to the other lateral side that overhangs the housing 12 so as to support the angularly extending blower assembly 16. A fan blade 62 is connected to the lower end of the blower shaft 22 within the manifold in close adjacency to the upper inlet end 64 of a downwardly converging duct or nozzle 66 that extends from the manifold into the treating zone 44. The lower arcuate outlet end 68 of the duct is closely spaced from the wall 60 of the drum. The longitudinal axial flow axis of the duct 66 is axially aligned with the rotational axis of the blower shaft 22 in radial relation to the rotational axis of the drum through shaft 32. Accordingly, heated combustion products and gases are conducted with an increasing velocity induced by rotation of blower fan blade 62 radially into the rotating drum on one lateral side to transmit heat by convection and agitate the scrap material by a jet stream of gases. The gases when cooled descend below the trough 50 and are controllably vented through vent pipe 68.

EXAMPLE I

In one example of the method, a batch of scrap material in the form of electrical wire sections weighing 10 pounds was loaded into the furnace housing. The wire sections had a fine strand copper core and a polyethylene coating as insulation. The fuel was a mixture of natural gas and air supplied to the burner at a 8:1 air to gas ratio. The inflow rate of fuel was set to 250 cubic feet per hour to promptly obtain an optimum temperature of approximately 800° F and thereafter decreased by a varying amount programmed to match the heat released by decomposition of the wire coating so as to maintain the optimum temperature substantially constant for approximately 20 minutes sufficient to accommodate decomposition of all of the non-metallic coatings. The solid decomposition residue or ash separated easily from the metal core leaving a substantially pure copper product.

EXAMPLE II

The method was used in a zinc recovery made wherein the batch of scrap material loaded into the rotatable drum 24 had the following weight content:

| Material | Percentage |
| --- | --- |
| Zinc | 33 |
| Other non-ferrous metals | 27 |
| Non-metallics | 40 |

The non-metallics included plastics, rubber and fabrics and debris. The foregoing scrap material was derived from junked automobiles with the ferrous metals separated out magnetically.

The furnace was heated by combustion of fuel as in example I until a temperature of 660° F was attained within the treating zone 44. With the drum 24 rotating continuously and the blower 16 in operation, this temperature was maintained substantially constant for approximately 2½ hours by variation of the fuel inflow rate as aforementioned. At this 660° F temperature, the non-metallics decomposed and the lead melted. The decomposition residue or ash together with the molten lead was collected in the trough 50 and removed.

The foregoing procedure effectively removed lead and the non-metallics from the batch of scrap material being processed in drum 24. The remaining material in the drum was then elevated in temperature, by increasing the inflow rate of fuel to 850° F at which zinc melts. With the drum rotating and the blower operating, this temperature level was maintained constant for 1 hour by inflow fuel rate regulation resulting in the melting of substantially all of the zinc in the batch and collection thereof in the trough 50 for recovery purposes.

The effectiveness of the method described in separating non-metallics from the non-ferrous metals to be recovered, depends on the temperature control exercized by variation of the inflow rate of combustion fuel in accordance with the heat it releases by combustion of the fuel and the heat released by non-combustible reaction or decomposition. By utilizing a non-oxidizing atmosphere in the treating zone 44 of the furnace, combustion of the material being processed is avoided so as to preclude disturbance of temperature control as well as to enable easier separation of the remaining metal from the decomposed non-metallics. Since combustion of the fuel must be isolated from the combustion-free treating zone and combustion heat must therefore be transmitted by convection, the method is significantly enhanced by blower induced convection flow. Tumbling of the scrap material in a rotating drum enhances uniform heat distribution and separation of decomposed and molten portions from the batch of material being processed.

The foregoing is considered as illustrative only of the principles of the invention. Further, since numerous modifications and changes will readily occur to those skilled in the art, it is not desired to limit the invention to the exct construction and operation shown and described, and accordingly all suitable modifications and equivalents may be resorted to, falling within the scope of the invention.

I claim:

1. In an apparatus for recovering metal from a mixture of scrap material, a housing enclosing a treating zone and a source of heated gases, a drum rotatably mounted within the treating zone having a perforated wall enclosing said mixture of scrap material, agitating means for imparting rotation to the drum, duct means mounted in the housing for conducting heated gases from said source to the treating zone in radial relation to the drum, and blower means for inducing forced flow of said heated gases through the duct means and into the drum during rotation through the perforated wall to heat the mixture and enhance agitation thereof, said duct means including a manifold in fluid communication with the source and the treating zone and a downwardly converging conduit extending from the manifold into the treating zone injecting a jet stream of said heated gases into the drum.

2. Apparatus for recovering metal from a mixture of scrap material, comprising an internally insulated housing, means internally partitioning the housing into a fire chamber and a treating zone, a burner mounted within the fire chamber, a drum rotatably mounted within the treating zone having a perforated wall enclosing said mixture of scrap material, a collection trough fixedly mounted within the treating zone below said drum, duct means mounted on the housing for conducting heated gases from the fire chamber into the treating zone in radial relation to the drum, and blower means for inducing flow of said heated gases through the duct means and into the drum through the perforated wall, said duct means including a manifold mounted on the housing above the fire chamber and the treating zone and a downwardly converging conduit extending from the manifold into the treating zone, said conduit including an inlet end conncted to the manifold in a plane perpendicular to a longitudinal flow axes of the conduit extending radially upwardly from the drum on one lateral side thereof, and an arcuate outlet end closely spaced from the drum.

3. The combination of claim 2 wherein said blower means includes a fan blade assembly rotatably mounted within the manifold in close adjacency to said inlet end of the conduit.

* * * * *